UNITED STATES PATENT OFFICE.

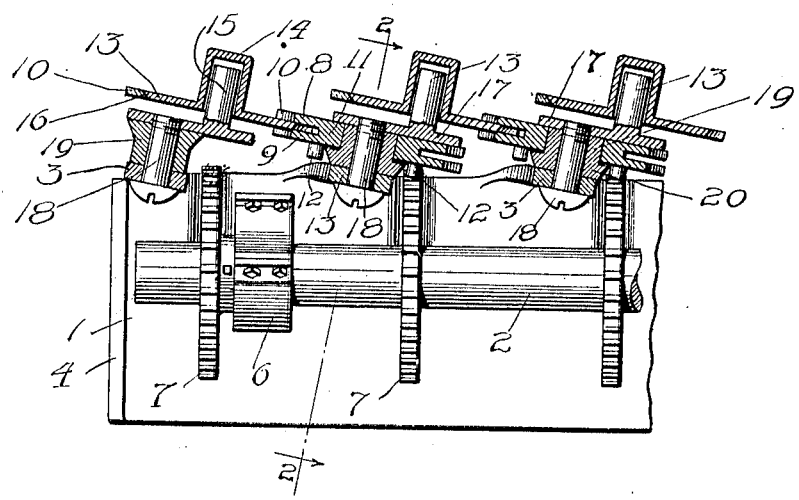

HUBERT H. MONTAGUE, OF TRAVERSE CITY, MICHIGAN.

MOWING-MACHINE.

1,317,212.   Specification of Letters Patent.   Patented Sept. 30, 1919.

Application filed August 17, 1918, Serial No. 250,268. Renewed August 20, 1919. Serial No. 318,777.

*To all whom it may concern:*

Be it known that I, HUBERT H. MONTAGUE, a citizen of the United States, residing at Traverse City, county of Grand Traverse, State of Michigan, have invented a certain new and useful Improvement in Mowing-Machines, and declare the following to be a full, clear, and exact description of the same, such as will enable others skilled in the art to which it pertains to make and use the same, reference being had to the accompanying drawings, which form a part of this specification.

My invention has for its object to produce a simple and novel mechanism by means of which, through the addition or elimination of any desired number of duplicate units, a mowing machine of any desired width may be produced.

A further object of my invention is to produce a simple and novel mechanism which may be employed advantageously either in a lawn mower of any desired size or in a mowing machine intended to cut hay or other farm products.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a transverse section through a fragment of a mowing machine arranged in accordance with a preferred form of my invention; a section being taken approximately on line 1—1 of Fig. 2;

Fig. 2 is a section taken in a plane at right angles to the plane of Fig. 1 and approximately on line 2—2 of Fig. 1; and Fig. 3 is a top plan view of the parts shown in Figs. 1 and 2 looking downwardly in a direction parallel with line 1—1 of Fig. 2.

Referring to the drawing, 1 represents a frame which may take any desired form as its functions are simply to support the driving shaft, 2, and the cutting elements in operative relation to each other. In the arrangement shown, the frame consists of a comparatively narrow plate member having at the front edge a series of forwardly projecting ears, 3, bent at an angle to the body of the plate and having at the ends downwardly projecting flanges, 4; the flanges 4 projecting forwardly a considerable distance beyond the ears and being pointed at their front ends as indicated at 5.

On the shaft 2 which is supported in suitable bearings, 6, of which only one is shown, are a series of peripherally toothed wheels, 7, which serve both as rolling supports for the machine and as driving members for the cutting elements. Where the machine forms part of a farm mowing machine as distinguished from an ordinary lawn mower, the shaft 2 may be geared to the driving wheels of the mowing machine or be connected to any suitable driving element.

The cutting mechanism comprises a series of small units each made up of coöperating toothed cutting wheels, and each unit is driven from one of the toothed wheels 7. In the arrangement shown there is revolubly supported on each of the ears 3 a cutting member made up of two disks, 8 and 9, coaxial with each other and spaced apart from each other a distance about equal to the thickness of one of the disks, each of the members 8 and 9 being provided with a series of peripheral teeth, 10. The members 8 and 9 may conveniently be formed out of a single piece which is first given the desired contour and is then slotted circumferentially. In any event the members 8 and 9 are preferably rigidly connected together so as to act, when in operation, as a single piece. On the under side of the connected toothed disks 8 and 9, to which I shall refer as a whole as the member 11, are downwardly projecting pins, 12, which mesh with the teeth in the wheels 7 so that when the wheels revolve the members 11 also revolve. Coöperating with each of the members 11 is a single disk, 13, fitting between the disks 8 and 9 and supported so that it may revolve freely about an axis parallel with the axis of the coöperating double disk member. In the arrangement shown, each of the disks 13 is provided at the center with an upwardly projecting thimble-shaped part, 14, which overlies and is loose upon a stationary post, 15. In other words, the single disk cutters are floating members which receive their main support from and adjust themselves to the double disk cutters. The disks 13 are provided with teeth, 10, similar to those on the double disk members. The teeth are preferably in the nature of ratchet teeth that is, one edge of each tooth is preferably approximately radial while the opposite edge may take any desired shape; and the teeth in the single disk of each unit are disposed so as to face in the opposite direction from those in the double disk member. Consequently, when the disks of a unit are revolved, the double disk being positively driven and the single disk being frictionally driven, the two sets of teeth gather in the blades of grass or other material to be cut and draw them to the shearing point. The shearing point is of course the point where the two elements of the unit begin to overlap on the front side of the machine and the shearing is accomplished between the edges of the disks. In order to secure a better shearing edge, the under side of each single disk may be beveled as indicated at 16.

The supporting posts, 13, may be supported in any suitable way. In the arrangement shown, each of the posts 13 projects upwardly from a plate, 17, fixed upon the upper end of a screw, 18, passing upwardly through one of the ears 3. The screws, 18, may serve also to hold in place the double disk members. This latter function may conveniently be accomplished by journaling the double disk members on sleeves, 19, having annular shoulders or collars, 20, upon which the disk members lie; the screws 18 passing upwardly through the ears 3 and the sleeves 19 being screw threaded or otherwise fastened into the plates 17. At one end of a series of units, in the arrangement shown the left hand end, there will be only a single disk but the same means heretofore described, namely the plate 17, the screw 18, and the sleeve 19 may be used to support it.

If the disks were all placed so as to lie parallel with the shaft or axle 2, the cutting points would lie in an irregular line because each unit must be offset from the adjacent units lengthwise of its axis. In order to obviate this condition and bring all of the cutting points in a horizontal line, the disks are supported at a slight angle as viewed from the front.

In a machine of this kind it is desirable that the cutting disks be comparatively small so that they can be cheaply made and be replaced at a comparatively small expense when they become worn. Therefore, in order to bring the cutting points considerably in advance of the shaft or axle 2, so that the grass or other material will be engaged by the teeth of the disks and drawn to the cutting point before striking the axle or shaft and thus being pushed away from the cutters, I arrange the disks so that as viewed from the side they lie above the upper front quarter of the driving wheels and are inclined downwardly at an angle of fifty degrees or sixty degrees to the horizontal.

In operation each unit cuts the material coming directly in front of the adjacent halves of the two cutting elements, each double disk member turning in the opposite direction from the overlying single disk member and having its teeth facing in the opposite direction so that the grass or other material is divided by these two elements, a part being carried laterally in one direction and the remainder in the opposite direction. It will thus be seen that no blade of grass or other element to be cut needs be shifted laterally very far before reaching the cutting edge and consequently a substantially even cut will be produced.

It will now be seen that a machine of any desired width may be obtained by simply increasing the number of cutting units so that throughout a series of machines of various sizes all parts except the mere shaft and supporting frame are interchangeable. It will also be seen that a unit may readily be removed and replaced by another or, in case the entire cutting mechanism becomes dull, a new set of cutters may be substituted therefor at a comparatively small cost.

Since the toothed supporting wheels engage with the ground they may become clogged with earth but this will not interfere with their satisfactory operation as driving members because the pins 12 do not enter between the teeth of these wheels as do the teeth of spur gears, but they enter sidewise and thus serve to push the accumulated foreign matter ahead of them out through the opposite side. The cutting units also clear themselves of the grass or other material which is being cut because the teeth on the cutting disks that come in contact with the material that has been cut off are traveling in a direction to throw it back out of the way.

It will further be seen that the machine as a whole is very light, it being possible to make a lawn mower having a width of eighteen or twenty inches and weighing not over six or seven pounds so that it may be carried about as one carries a shovel or a rake or a hoe.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. A mowing machine comprising a plurality of small cutting units arranged in a row, each cutting unit comprising a pair of disks overlapping each other and adapted to revolve in opposite directions, the disks having cutting edges extending circumferentially thereof together with projecting teeth distributed along said edges for bringing the grass or other material to be cut to the shearing point.

2. In a mowing machine, a plurality of cutting units arranged in a row, each unit comprising a pair of disks overlapping each other and adapted to revolve in opposite directions, the disks having projecting teeth at their edges for bringing the material to be cut to the shearing point, a shaft extending underneath said row of units, said shaft having thereon a series of toothed wheels in the form of disks with peripheral teeth arranged one in proximity to each cutting unit, and one of the disks of each unit having downwardly projecting pins adapted to engage with the teeth in the corresponding wheel to afford a driving connection.

3. In a mowing machine, a plurality of independent cutting units arranged in a row, a shaft extending along said row underneath the same, a series of toothed supporting wheels for said machine fixed upon the shaft one in proximity to each of said units, and devices on each unit adapted to coöperate with the teeth in the corresponding wheel to cause the cutting units to operate when the machine is pushed over the ground.

4. In a mowing machine, a cutting unit comprising a pair of concentric disks fixed together and spaced apart from each other, and a single disk extending between the aforesaid disks and adapted to be driven frictionally thereby.

5. In a mowing machine, a cutting unit comprising a pair of concentric disks fixed together and spaced apart from each other, and a single disk extending between the aforesaid disks and adapted to be driven frictionally thereby, said disks having peripheral shearing edges and gathering teeth projecting beyond the shearing edges.

6. In a mowing machine, a shaft, a series of toothed wheels fixed to the shaft and adapted to run upon the ground, a frame supported on the shaft, and a series of cutting units supported on the frame above and slightly in advance of the shaft, there being as many cutting units as there are wheels on the shaft, and means for driving each of said units from the corresponding wheel.

7. In a mowing machine, a shaft, a series of toothed wheels fixed to the shaft and adapted to run upon the ground, a frame supported on the shaft, and a series of cutting units supported on the frame above and slightly in advance of the shaft, there being as many cutting units as there are wheels on the shaft, each of said units comprising two concentric disks and a single disk extending into the space between and adapted to be frictionally driven by said concentric disks, and means associated with each set of concentric disks for engaging with the teeth in the corresponding wheel to drive the same.

8. In a mowing machine, a plurality of cutting units arranged in a transverse row, each unit comprising two concentric connected disks spaced apart from each other and a single disk extending into the space between the aforesaid disks, the disks of each unit being mounted so as to be revoluble about parallel axes inclined slightly to the vertical as viewed from the front of the machine and inclined forwardly at a considerable angle to the vertical as viewed from the side of the machine.

9. In a mowing machine, a plurality of cutting units arranged in a transverse row, each unit comprising two concentric connected disks spaced apart from each other and a single disk extending into the space between the aforesaid disks, the disks of each unit being mounted so as to be revoluble about parallel axes inclined slightly to the vertical as viewed from the front of the machine and inclined forwardly at a considerable angle to the vertical as viewed from the side of the machine, a shaft arranged underneath the cutting units and in rear of a vertical plane containing the cutting points, and driving connections between said shaft and said units.

10. In a mowing machine, a plurality of cutting units arranged in a transverse row, each unit comprising two concentric connected disks spaced apart from each other and a single disk extending into the space between the aforesaid disks, the disks of each unit being mounted so as to be revoluble about parallel axes inclined slightly to the vertical as viewed from the front of the machine and inclined forwardly at a considerable angle to the vertical as viewed from the side of the machine, a shaft arranged underneath the cutting units and in rear of a vertical plane containing the cutting points, and an independent driving connection between said shaft and each of said units.

11. In a mowing machine, a plurality of cutting units arranged in a transverse row, each unit comprising two concentric connected disks spaced apart from each other and a single disk extending into the space between the aforesaid disks, the disks of each unit being mounted so as to be revoluble about parallel axes inclined slightly to the vertical as viewed from the front of the machine and inclined forwardly at a considerable angle to the vertical as viewed from the side of the machine, and each unit being so disposed with relation to the adjacent units that the cutting points of all of the units lie approximately in the same horizontal plane.

12. In a mowing machine, a cutting unit comprising a pair of concentric disks connected together and spaced apart from each other, means for supporting said concentric disks so as to permit them to rotate about a fixed axis and prevent them from moving in any other direction, a single disk arranged beside the aforesaid disks and fitting at one side between the latter disks, and means for yieldingly supporting the single disk so as to permit it to rotate and at the same time adjust its position in order to remain in proper frictional contact with the coöperating disks.

13. In a mowing machine, a cutting unit comprising a pair of concentric disks connected together and spaced apart from each other, means for supporting said concentric disks so as to permit them to rotate about a fixed axis and prevent them from moving in any other direction, a single disk arranged beside the aforesaid disks and fitting at one side between the latter disks, means for yieldingly supporting the single disk so as to permit it to rotate and at the same time adjust its position in order to remain in proper frictional contact with the coöperating disks, each of said disks having ratchet-shaped gathering teeth on the periphery, and the teeth on the single disk being oppositely disposed relatively to the teeth on the other two disks.

14. In a mowing machine, two parallel journal members, a pair of concentric connected disks spaced apart from each other revolubly mounted on one of said journal members, the single disk having at the center a thimble-like member overlying and surrounding the other journal member, the single disk fitting into the space between the aforesaid disks, and the thimble being large enough to permit a considerable lost motion between it and the journal member with which it is associated.

In testimony whereof I sign this specification.

HUBERT H. MONTAGUE.

Copies of this patent may be obtained for five cents each, by addressing the "Commissioner of Patents, Washington, D. C."